(No Model.)

M. THOMAS.
FEED RACK.

No. 314,273. Patented Mar. 24, 1885.

WITNESSES:
John C. Deemer
C. Sedgwick

INVENTOR:
M. Thomas
BY Munn & Co
ATTORNEYS.

UNITED STATES PATENT OFFICE.

MANLY THOMAS, OF ORLINDA, MISSOURI.

FEED-RACK.

SPECIFICATION forming part of Letters Patent No. 314,273, dated March 24, 1885.

Application filed April 11, 1884. (No model.)

*To all whom it may concern:*

Be it known that I, MANLY THOMAS, of Orlinda, in the county of Linn and State of Missouri, have invented a new and Improved Feed-Rack for Horses, &c., of which the following is a full, clear, and exact description.

This invention consists in a portable hay and other rack for feeding horses, cattle, sheep, &c., constructed to admit of its being readily loaded on an ordinary farm-wagon, and, after being transported to wherever it may be needed, unloaded therefrom by the direct motion of the wagon, in connection with an adjustment of the legs of the rack, substantially as hereinafter described.

Reference is to be had to the accompanying drawings, forming part of this specification, in which similar letters of reference indicate corresponding parts in both the figures.

Figure 1:
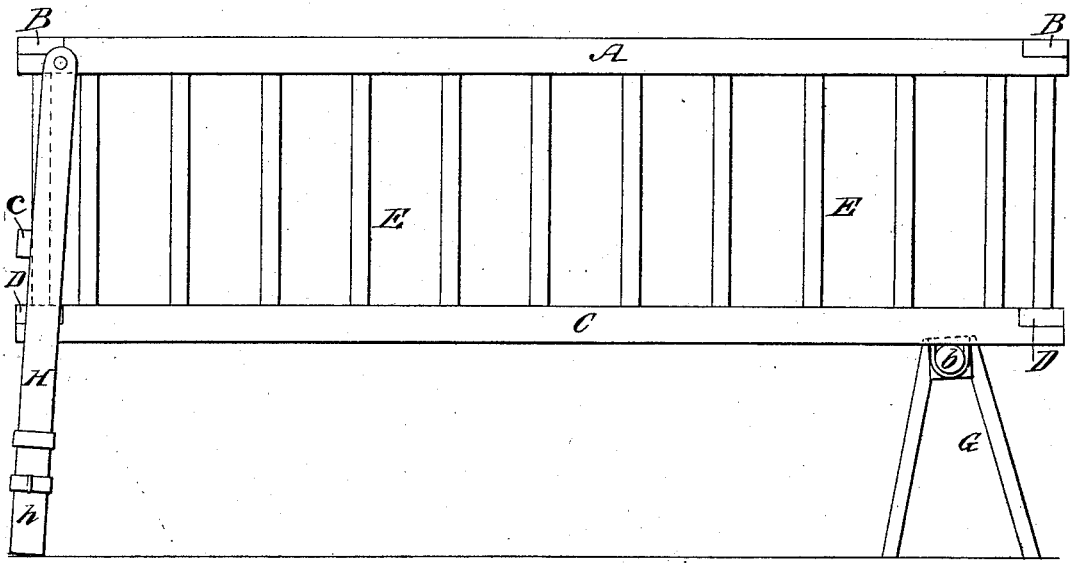
Figure 2:
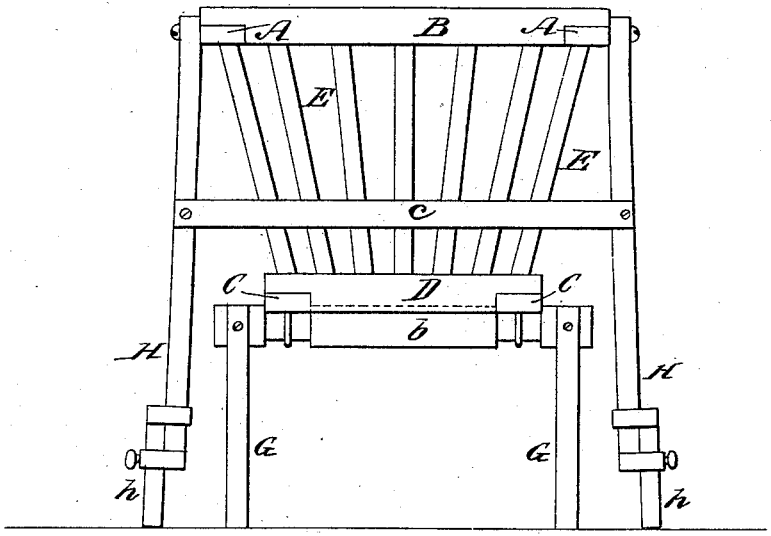

Figure 1 represents a side view of the rack in a standing position, and Fig. 2 a front end view of the same.

The rack, which may be of considerable length and sufficiently wide to rest easily on an ordinary farm-wagon, has its body, that is composed of upper and lower side and end rails, A B and C D, united by rounds or slats E, made flaring in an upward direction. The rounds or slats E should be so fitted as not to interfere with the stakes on the wagon. The rear end of the rack is supported by swinging trestles G G or front and rear legs on each side, attached to a rolling lower cross-shaft, b, and the forward end of it by legs H H, pivoted to the upper rails and united by a cross-bar, c. The inner legs of the trestles G G should be somewhat shorter than the outer legs thereof, so as to give the latter legs a good bracing pitch, and the front legs, H H, should also be set bracing, the cross-bar c resting against the front end rounds or slats, E, where they may be secured to prevent the rack from falling after being set up. The bracing arrangement of the several legs gives a firm support to the rack. The front legs, H H, have slip extensions h h at their lower ends, to facilitate, by taking up said extensions, the movement of the rack to and from the feeding ground or place. Said legs may also be folded or thrown up bodily over the front end of the rack when moving it across country. The trestles G G may also be turned up out of the way.

To load the rack on the wagon when said rack is in a standing position on its several legs, the wagon is run under the body of the rack from its front end, and the several legs then adjusted to lower or rest the rack on the wagon, and to keep them clear of the ground and out of the way when transporting the rack, and after the rack has been moved to the feeding-place the several legs again adjusted or lowered into a supporting position and the wagon drawn by the team from under the rack, the cross-bar c of the front legs, H H, then not only serving to stiffen said legs, but by its resting against the front end rounds or slats, E, preventing the rack from being pulled too far when being drawn into position by the team.

Having thus described my invention, what I claim as new, and desire to secure by Letters Patent, is—

1. The combination, with the rack-body, of the pivoted front legs, H H, united by a cross-bar, c, and the rear swinging double-legged trestles G G, arranged to brace the rack when in their supporting position, essentially as described.

2. The pivoted legs H H, fitted with lower slip extensions, h h, in combination with the rack-body and swinging rear legs or trestle-supports, substantially as and for the purpose specified.

MANLY THOMAS.

Witnesses:
  D. E. NORVELL,
  L. F. NORVELL.